United States Patent [19]
Johnson et al.

[11] Patent Number: 5,917,669
[45] Date of Patent: *Jun. 29, 1999

[54] METHOD FOR TRANSFERRING OPERATIONAL DATA BETWEEN STATIONS DURING A DISK FORMAT PROCESS

[75] Inventors: Paul Ronald Johnson, Kaysville; Weimin Pan; Robert L. Short, both of Ogden; Mark Dale Thornley; Don Wilford Wallentine, both of Layton, all of Utah

[73] Assignee: Iomega Corporation, Roy, Utah

[ * ] Notice: This patent issued on a continued prosecution application filed under 37 CFR 1.53(d), and is subject to the twenty year patent term provisions of 35 U.S.C. 154(a)(2).

[21] Appl. No.: 08/698,564

[22] Filed: Aug. 15, 1996

[51] Int. Cl.$^6$ ........................................................ G11B 5/09
[52] U.S. Cl. .............................. 360/53; 324/212; 360/69; 360/31
[58] Field of Search ................................. 360/15, 75, 25, 360/77.08, 69, 31, 53, 47, 48; 324/212, 226

[56] References Cited

U.S. PATENT DOCUMENTS

| | | |
|---|---|---|
| 3,761,905 | 9/1973 | Hollstein, Jr. et al. .................. 360/25 |
| 4,528,588 | 7/1985 | Lofberg ..................................... 360/60 |
| 5,019,929 | 5/1991 | Costas . |
| 5,115,358 | 5/1992 | Widney . |
| 5,162,955 | 11/1992 | Burdenko . |
| 5,170,299 | 12/1992 | Moon .................................. 360/77.08 |
| 5,210,672 | 5/1993 | Ivers et al. .............................. 360/135 |
| 5,333,140 | 7/1994 | Mararu et al. . |
| 5,410,439 | 4/1995 | Egbert et al. ............................. 360/75 |
| 5,485,322 | 1/1996 | Chainer et al. . |
| 5,500,776 | 3/1996 | Smith . |

*Primary Examiner*—Aristotelis M. Psitos
*Assistant Examiner*—Alan Faber
*Attorney, Agent, or Firm*—Woodcock Washburn Kurtz MacKiewicz & Norris LLP

[57] ABSTRACT

Inserting operational data onto a magnetic disk allows information to be transferred from a servowriter station to a verifier station. This operational data allows disk specific operational data to follow the disk without separate means for attaching data to each disk. The servowriters, which cannot write information to disks at the data sector frequency, inserts the operational data into selected greycodes in the servo sectors. When the disks are verified, the operational data may be moved from the servo sectors to the data sector in the Z-tracks for more permanent storage.

27 Claims, 5 Drawing Sheets

METHOD FOR TRANSFERRING OPERATIONAL DATA BETWEEN STATIONS DURING A DISK FORMAT PROCESS

FIELD OF THE INVENTION

The invention relates to disk formatting using a servowriter. More particularly, this invention relates to methods of passing disk specific information from a servowriter to other downstream processes by recording the information on the disk during the servowrite process.

BACKGROUND OF THE INVENTION

A magnetic disk is commonly used in computer systems as a data storage medium. However, before the magnetic disk can be used by a disk drive, the disk must be formatted. The typical magnetic disk may be formatted to contain thousands of "tracks" of information, organized as concentric rings on the disk surface. These tracks must be precisely followed by the disk drive's read/write electronics during the operation of the disk to store information to and read information from the disk's surface. In a typical track following technique, the read/write electronics follow the tracks via servo sectors embedded at regular intervals around the track.

In the case of high track density disks, the tracks are pre-recorded on the disk surface in a factory environment before the disk is suitable for use in a disk drive. Each blank disk is prepared for use by a device commonly referred to as a "servowriter." The servowriter is a machine dedicated to embedding servo signals into the disk's surface. After the servowriter has recorded the servo information in the servo sectors, the disk is checked for quality (e.g., by verifying the accuracy of the servo information). In some instances, for example where the disks are used in removable media drives, the verification process occurs at a separate time and place from the servowriting process at a device sometimes referred to as a verifier.

Often, the servowriter and the verifier need the same data with regard to a particular disk. One particularly important example is the identification of the servowriter used to format a disk. This information is readily available at the time of the disk format. However, after the disk is removed from the servowriter and moved to a different location, the identity of the formatting servowriter may not be readily apparent. This identity becomes significant because, at times, a defective or poorly calibrated servowriter will introduce errors into the formatting process. Unfortunately, in the case of removable media disks, the errors may not be discovered until the disks are checked by the verifier. Tracking the servowriter is difficult because disks are prepared by numerous servowriters. Moreover, those servowriters may be located at a number of different locations. Nevertheless, to ensure maximum disk quality, it is important to be able to trace each disk back to the servowriter that formatted it. In this way, a servowriter that formats poorly can be discovered and corrected. If, for example, a single servowriter is responsible for introducing the majority of bad disks, that servowriter must be identified and corrected.

Some disk manufacturers have used bar codes to trace the disks back to the servowriters and to provide other disk specific information. However, this requires some means for affixing a bar code to the disk, requiring an additional layer of expense and complexity. For example, attaching a bar code will add to the cost of producing each disk, or expensive equipment may be needed to properly track the disks. Moreover, an additional bar code scanning step may be required at the verifier.

An additional example of data needed by both the verifier and the servowriter is media type. A variety of vendors may supply media readable by the same disk drive. Significantly, each of those media may have different characteristics that the verifier, and eventually a user's drive, should recognize. This media type information is also needed by the servowriter during the format process. Applicants have recognized that entering the data once, at the servowriter, and passing the data to the verifier would lead to fewer errors and higher quality.

For the foregoing reasons, applicants have recognized that a method of efficiently passing data between a servowriter and a verifier would translate into substantial cost savings when aggregated over the large volume of disks produced and cut down on errors caused by redundant data entry. Consequently, there is a long-felt need for a method of efficiently transferring disk specific information from a servowriter to a verifier or other devices, such as disk drives.

SUMMARY OF THE INVENTION

The present invention meets the needs above by providing a method of recording the disk specific data (hereinafter "operational data") on each disk during the servowriter process and retrieving that information during verification. According to a presently preferred method of accomplishing that recordation and retrieval, a blank magnetic disk is formatted at a first station, e.g., a servowriter. While at the first station, an electromagnetic signal indicative of the operational data to be passed is embedded into the magnetic surface of the disks. The disk is then transported to a second station, e.g., a verifier. While the disk remains at the second station, the electromagnetic signal indicative of the operational data to be passed is retrieved off of the disk surface.

In a presently preferred embodiment, the operational data is embedded in a guard band track. Preferably, the operational data is inserted into a grey code field in the guardband track.

In a further aspect of the present invention, it is necessary to record the operational data in a more accessible location on the disk. Accordingly, in some instances, after the disk is transported to the second station, the operational data is moved to a second location on the disk, for example, the Z-track.

According to another aspect of the present invention, the operational data comprises a station identifier indicative of the formatting servowriter. Thus, a blank disk is initially formatted on a servowriter, wherein a servowriter station identifier is recorded on the disk. Thereafter, the disk is verified on a verifier. The verifier reads the servowriter station identifier and uses that identifier to trace the performance of each servowriter. As such, for each disk that passes verification for a particular servowriter, a servowriter quality value, maintained for each servowriter, is increased. On the other hand, for each disk that fails verification, the corresponding servowriter quality value is decreased. These servowriter quality values can be used to track the servowriter quality over time and to flag a servowriter that consistently produces a high failure rate.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, with the understanding, however, that the invention is not limited to the specific methods and instrumentalities disclosed.

In the drawings.

DETAILED DESCRIPTION OF PREFERRED EMBODIMENTS

According to a presently preferred embodiment, a method for recording information on disks during the servowriting process and recovering that information during the verification process will now be described with reference to the FIGURES. It will be appreciated by those of ordinary skill in the art that the description given herein with respect to those FIGURES is for exemplary purposes only and is not intended in any way to limit the scope of the invention. For example, during the description of the preferred embodiment of the track layout, the number of tracks per disk, sectors per track and the like are used to illustrate the invention. However, such examples are merely for the purpose of clearly describing the method of the present invention and are not intended to limit the invention. Moreover, example applications are used throughout the description wherein the present invention is employed in conjunction with a particular disk drive system. That disk drive system application is not intended to limit the invention, as the invention is equally applicable to other systems.

Figure 1:
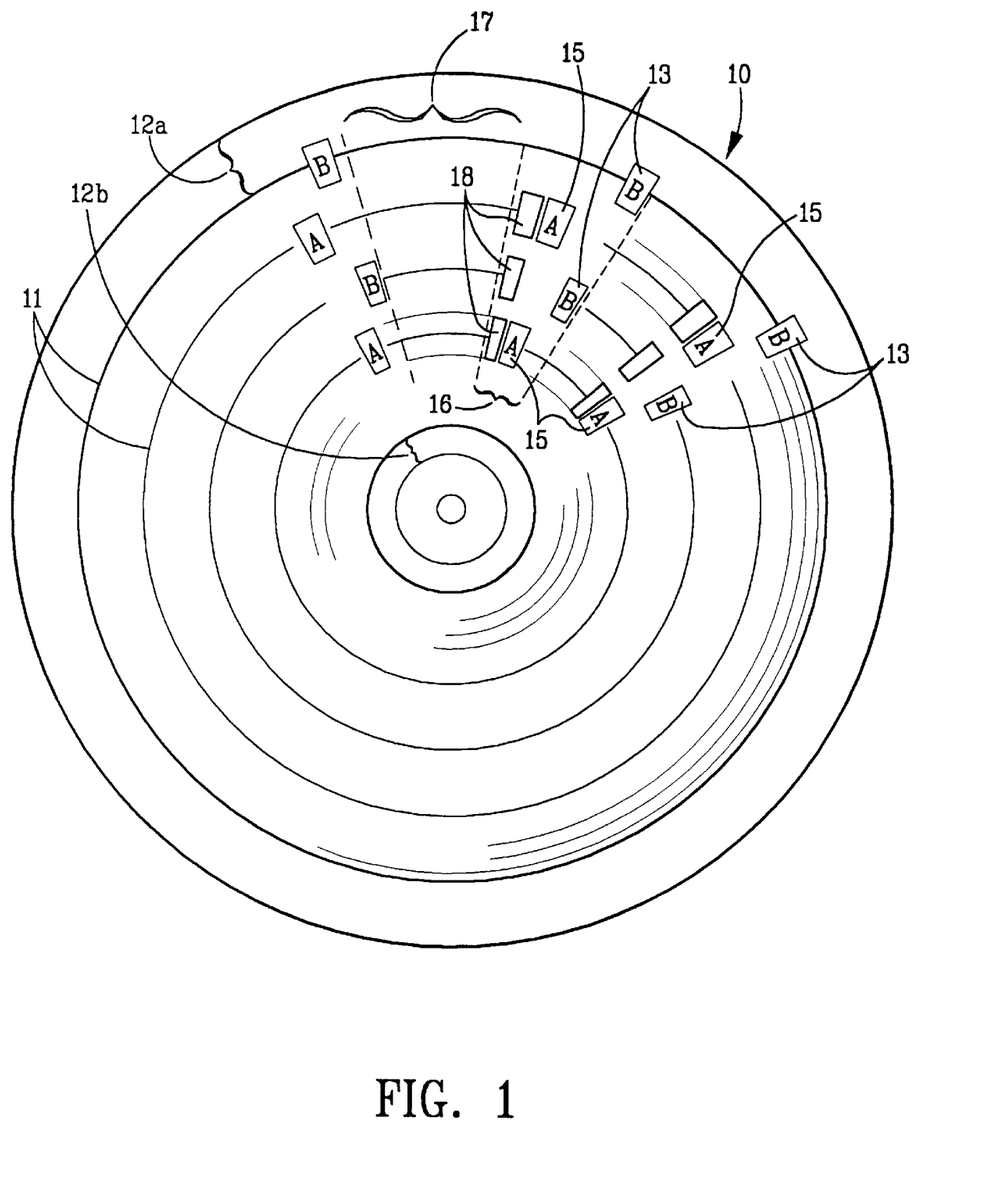
FIG. 1 depicts a magnetic disk and shows the location of format information.

Referring to the FIGURES, FIG. 1 depicts a magnetic disk 10 for use in a disk drive system (not shown) wherein the present invention may be employed. The magnetic disk 10 shown may be one of several different types. For example, the present invention may be employed with a magnetic disk 10 for a ZIP drive or JAZ drive cartridge, both of which are manufactured by IOMEGA corporation, the assignee of the present invention. In order for the disk drive system to be able to access the magnetic disk 10 and read from and write to the disk 10, the disk 10 must be formatted. In particular, a number of concentric tracks 11 must be defined over the surface of the disk 10. These tracks 11 are defined by the use of servo sectors 16. Each track 11 has a fixed number of servo sectors 16. A JAZ disk, for example, has servo sectors 16 sixty times per track 11 or every six degrees. Thereafter, when the disk 10 is used by a disk drive, the disk drive read/write electronics can read the servo sectors 16 and use that information to precisely follow the tracks 11 via a servo-loop.

Other information must also be written to the disk 10 before it can be used in a disk drive. For example, the disk 10 must be subdivided into good sectors and tracks and bad sectors and tracks, i.e., those sectors and tracks that cannot be reliably used during operation, must be located and flagged. In the case of ZIP and JAZ disk cartridges, this information is placed onto a special track called the Z-track. Additionally, the disk 10 includes guard band tracks 12 at the innermost 12b and outermost tracks 12a. In general, these guard band tracks 12 are the same as all of the other tracks 11 on the disk. However, the disk drive electronics can determine whether a particular track 11 is part of the guard band 12 by the greycode number assigned to the track 11. In this manner, these guard band tracks 12 protect the disk drive read/write subsystem from traveling too far in or too far out during operation.

Figure 1A:
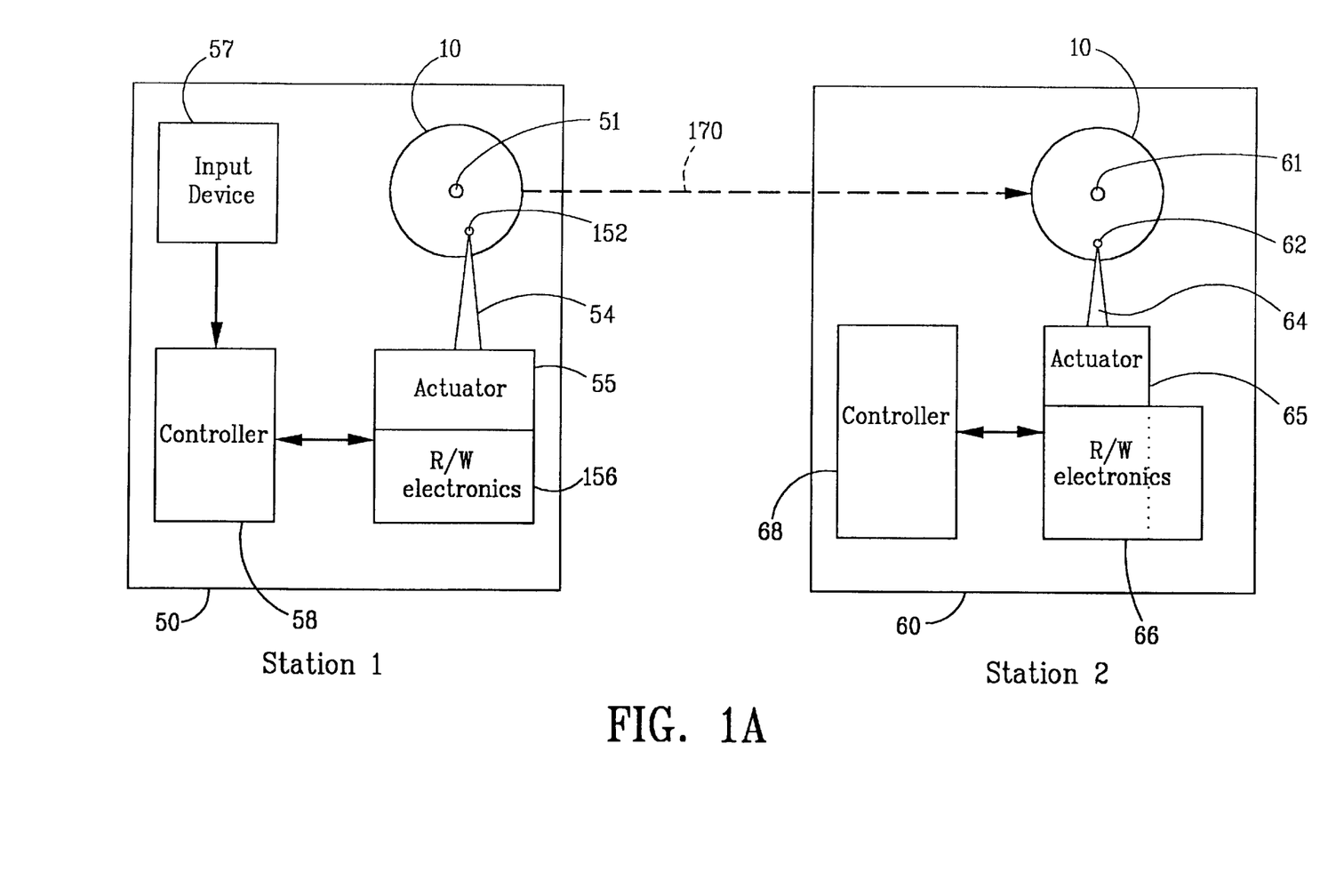
FIG. 1A is a block diagram of a servowriter and verifier disk format configuration.

In the case of ZIP and JAZ drive disks, as with many types of removable media disk cartridges, the format process is performed in two major steps. As shown in FIG. 1A, the first step in the format process is performed by a servowriter 50. The servowriter 50 is a finely calibrated formatting device that places servo sectors 16 at precise intervals on the surface of the disk 10. The major components of a servowriter 50 comprise a spindle 51 for holding a disk 10 and spinning it up to operational speed; a read/write head 52 for writing and reading servo information to and from the disk 10; an arm 54 for moving the head 52 across the disk surface; an actuator 55 for controlling movement of the arm 54; a controller 58 for executing and controlling the servowriting process; and read/write electronics 56 for translating the electromagnetic signals of the disk surface to and from a digital format that is understood by the controller 58. Additionally, the servowriter 50 comprises an input device, such as a keyboard, so that a servowriter operator can input information to control the servowriter process. Skilled artisans will appreciate that the servowriter 50 used to practice the present invention can be one of many commercially available units, such as Phase Metric/Helios MS 5000, appropriately modified to accept a particular variety of disk 10.

After the disks are formatted with the servowriter 50, they are transported to a verifier 60 as indicated by dashed line 70 to undergo a verification step. The verifier 60 checks each disk 10 by writing data to the disk 10 and reading the data back. In the presently preferred embodiment, the verifier 60 is simply a removable media disk drive, e.g., a ZIP or JAZ drive. The drives are modified to have special software designed to exercise the disk 10 by writing test data to it and reading the test data back from it. The major components of the verifier 60 are presented in block diagram form in FIG. 1A. Essentially, the verifier 60 comprises a controller 68 that controls the verification process that is executed on the verifier 68; read/write electronics 66 for translating data to and from the magnetic signals embedded in the disk surface; a read/write head 62 for reading and writing magnetic signals to or from the disk surface; an arm 64 for suspending and moving the read/write head 62 on the disk surface; an actuator 65 for moving the arm 64 in response to commands from the read write electronics 66; and a spindle 61 for rotating the disk 10 at operational speed. During the verification process, the format process performed by the servowriter 50 is checked and any sectors or tracks that cannot be read from or written to are flagged.

Significantly, as indicated by the dashed line 70 in FIG. 1A, the servowriter process and the verifier process occur at different stations 50, 60. Moreover, those stations may be at geographically separate locations. As a result, information available at the time of the servowriting process, such as media type, servowriter station and the like, will have to follow the disks 10 between stations. Furthermore, any errors that occur at the verifier 60 must be traced back to the servowriter 50 so that servowriter 50 induced errors can be corrected. Consequently, each disk 10 must be tagged with a variety of information so that the disks 10 can be identified throughout the format process and, perhaps, throughout its useful life.

According to an aspect of the present invention, operational data for each disk 10 is inserted onto the disks 10 during the servowriter process by the servowriter 50. Thereafter, the verifier 60 recovers the operational data written onto the disk by the servowriter 50. According to a presently preferred embodiment of the present invention and as will be described more fully below, the servowriter 50 embeds the operational data in the servo sectors 16 of the guard band tracks 12. Thereafter, when the operational data is recovered by the verifier 60, the information may be moved to a data sector 17 for more permanent storage, as different applications of the present invention may require.

Figure 2:
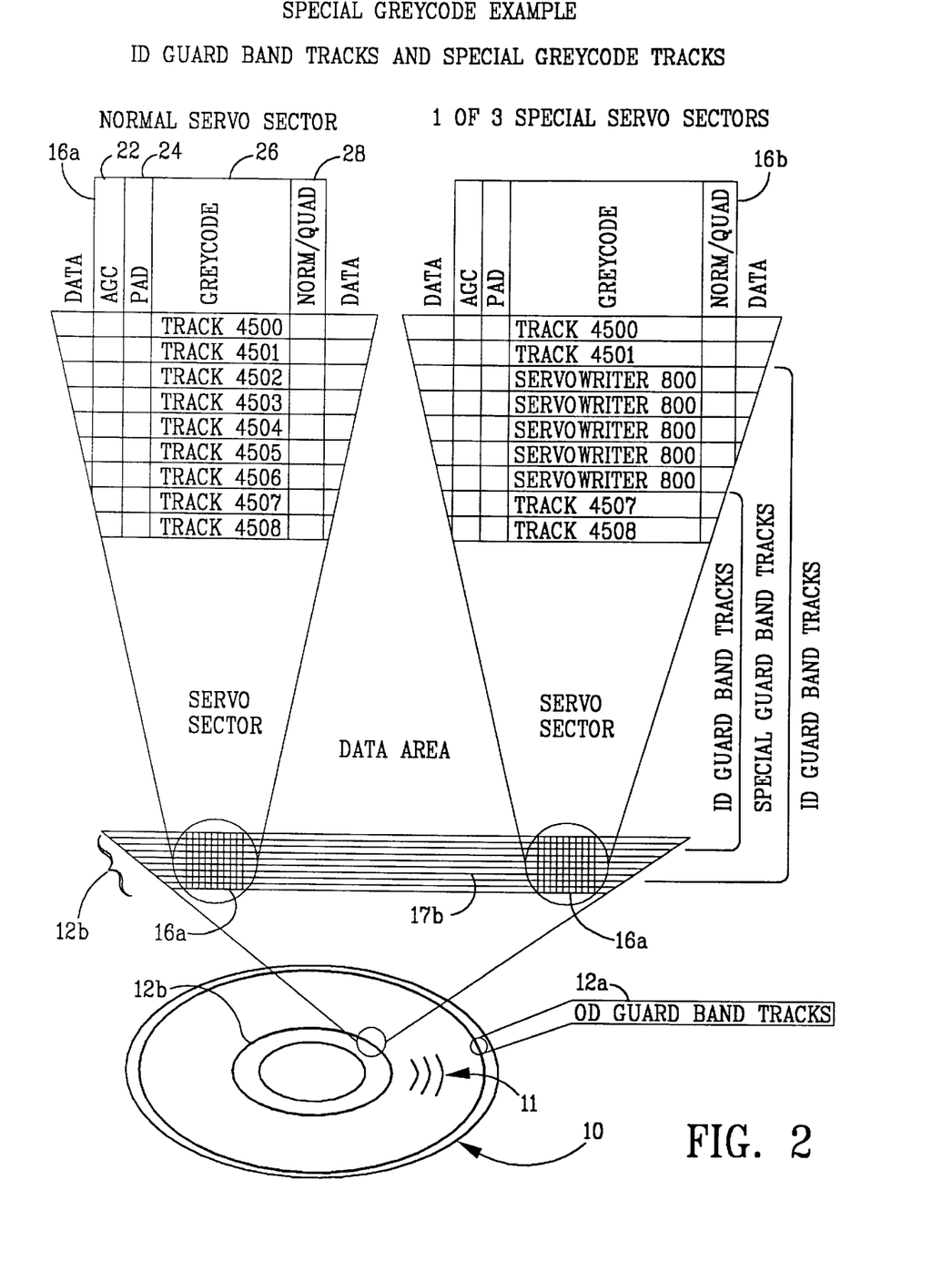
FIG. 2 depicts a portion of a magnet disk showing details of the servo sectors and data sectors.

Referring now to FIG. 2, an exploded view of a portion of the tracks 11 of the inner guard band 12b is shown. The tracks 11 of the guard band, just as normal tracks 11, have servo sectors 16 distributed around the tracks 11 at predefined intervals. As shown in detail in the exploded servo sector view 16b each servo sector 16 is comprised of an automatic gain control (AGC) 22, overhead pad 24, greycode 26 and norm/quad fields 28. Because conventional servowriter read/write electronics operate at a much lower speed than the read/writer electronics of verifiers (i.e., the servowriters write low frequency information), servowriters 50 may not be capable of writing data in the conventional data sectors 17 of the disk 10. However, the servowriter 50 is capable of writing lower frequency information in the servo sectors 16. Importantly, that information is readable by the verifier 60. Thus, according to a presently preferred embodiment of the present invention, the servowriter 50 writes data to be recovered by the verifier 60 into the servo sectors 16 of the disk 10. As will be described in detail below, in one example application, the information replaces several of the greycodes 26 in the tracks of the guard band of the disk 10.

Note, however, that the present invention relates to the broad concept of a servowriter 50 writing operational data in the low frequency servo sectors 16 of a disk 10 and recovering that operational data at the verifier 60. In this way, information readily available at the servowriter 50 does not have to separately follow each disk 10; rather, the information is embedded directly onto the disk 10, and as such automatically follows the disk 10 to the verifier 60. Those skilled in the art will recognize that many variations are possible to this fundamental concept. For example, the information could be written to the greycodes 26 as well as other servo sector 16 fields. Alternatively, a data area on the disk 10 could be used and the drive could be modified to read the appropriate frequency. Moreover, numerous applications for the transferred operational data are possible. As an example application, servowriter station identifiers could be written to each disk 10 and used to monitor the quality of each servowriter 50.

Figure 3:
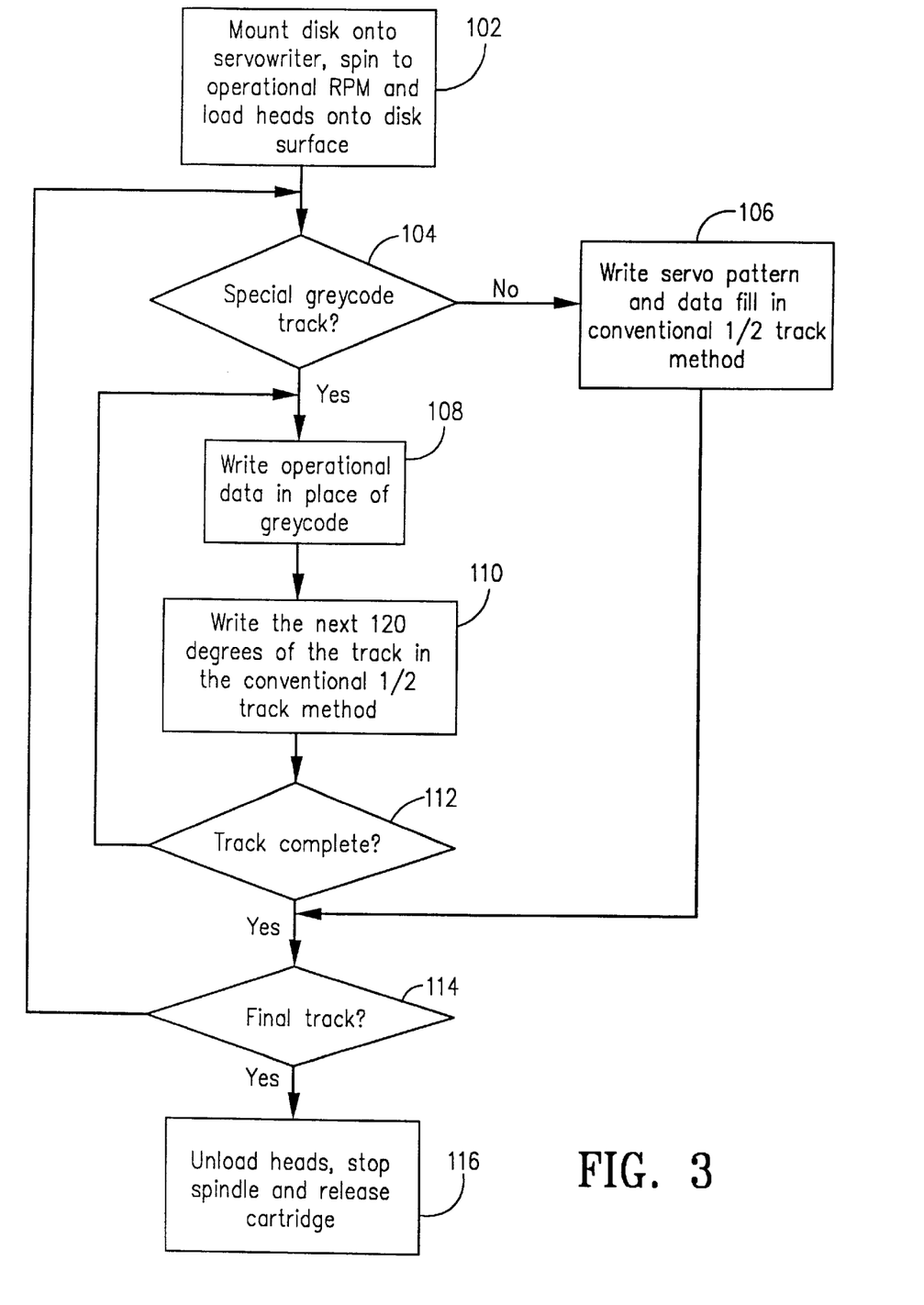
FIG. 3 is a flow chart of the magnetic disk format process wherein the present invention may be employed; and, FIG. 4 is a flow chart of the verification process wherein the present invention may be employed.

Referring now to FIG. 3, the process of recording operational data to disks 10 at the servowriter 50 is depicted. The process begins by mounting a disk 10 on the servowriter 50, spinning the disk 10 up to operational RPMs and loading the heads 52 onto the disk surface (step 102). After the heads 52 are loaded onto the disk surface, they begin to move across the surface writing tracks 11 via servo sectors 16 and embedding greycodes 26 as track identifiers within each servo sector 16 of each track 11. The heads 52 continue this process moving across the entire disk surface until all the tracks 11 are written. Since the greycode 26 is the track identifier, it is incremented for each successive track 11.

Each servo sector 16 contains a grey code field 26. Conventionally, this greycode field 26 contains the track number. As such, during the operation of the disk drive, the grey code is used to locate a track 11 when data from a particular track 11 is requested and is used to insure that the read/write heads remain on the proper track 11. However, within the guard band 12 the tracks 11 are not used during the normal operation of the disk drive. Thus, this guard band 12 greycode information can be modified with no potential impact on the operation of the drive. Accordingly, during the servowriter process, the operational data is inserted into a selected group of the greycode fields 26 within the guard band 12.

According to a preferred embodiment of the invention, when the tracks 11 of the guard band 12 are reached, some of the greycodes are written with the operational data in place of the normal greycode. Hence as depicted in FIG. 3, the servowriter process determines if the current track 11 is one of the tracks 11 to receive a special greycode (i.e. the operational data) (step 104). If not, the servowriter process continues normally, inserting servo sectors 16 with greycodes representative of the track number (step 106). On the other hand, if this is a special greycode track, e.g., within the guard band 12, then the operational data is inserted in the servo sector 16 in place of a normal greycode (step 108). The next one-third of the track (i.e., 120 degrees) is written with the normal greycode inserted into the greycode field 26 (step 110). This process continues until the track 11 is completed (step 112). Consequently, when each special greycode track is completed, it will have three servo sectors 16, spaced apart 120 degrees around the track, each of which servo sector 16 contains operational data rather than the greycode. By contrast, the remaining servo sectors 16 for the same track 11 will contain normal greycodes. This servowriting process continues until all tracks 11 have been formatted (step 114). When the process is completed the heads are unloaded, the spindle stops and the disk 10 is released (step 116). The formatted disks 10 are then transported to a verifier 60 where they are quality tested.

After the disks 10 arrive at the verifier 60, the operational data is extracted from the special greycode fields 26. In some instances, the operational data will also be saved as data on a different location on the disk (i.e. the tracks known as the Z-tracks). To begin the verification process the disks 10 are inserted into the verifier 60.

Figure 4:
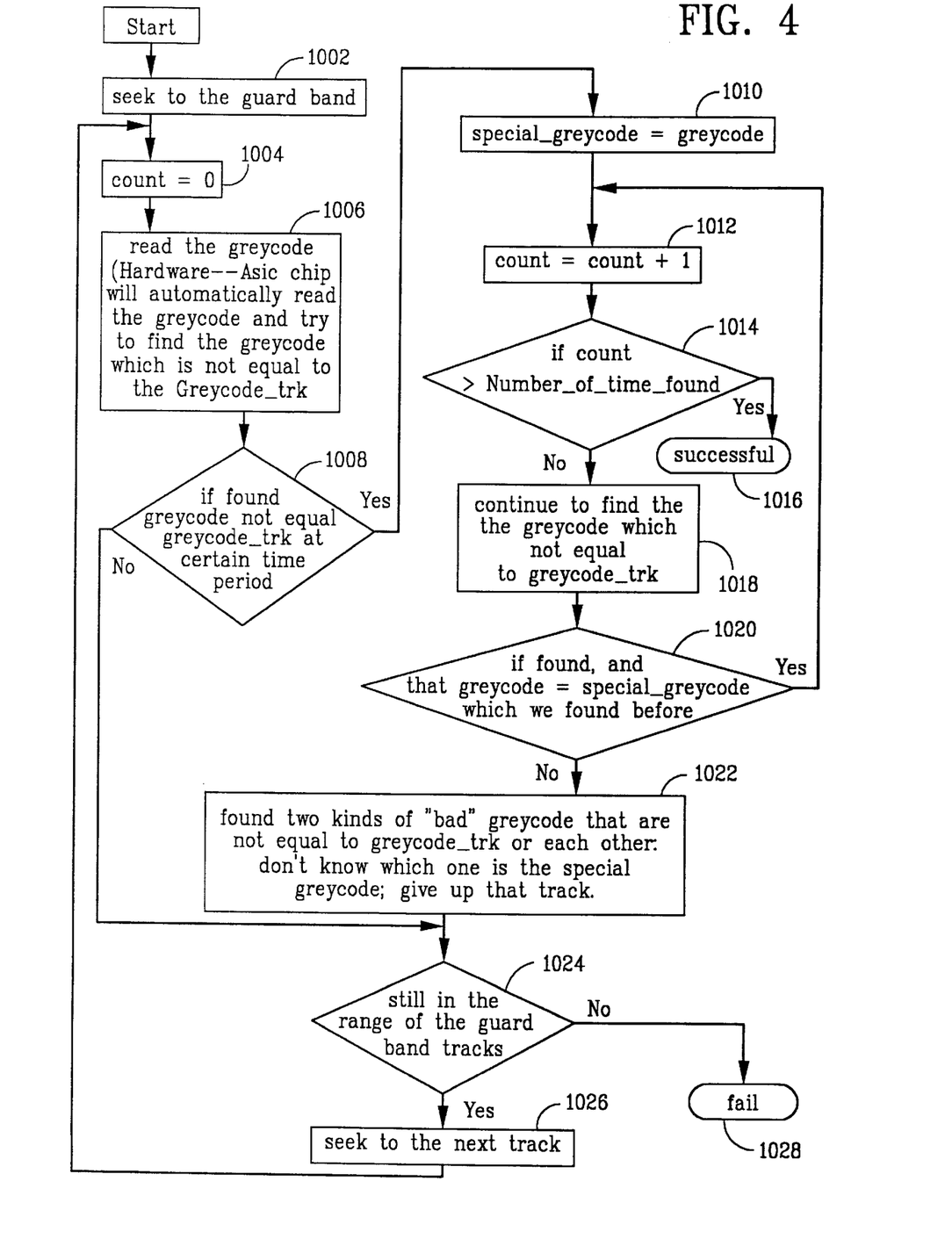

Referring to FIG. 4, a flow chart of the operational data extraction portion of the verification process is presented. The process begins when a disk is inserted into a verifier 60. Thereafter, the verifier 60 is commanded to seek to the inner guard band tracks 12b (step 1002), and a count is initialized to zero (step 1004). Starting with the first track 11 of the inner guard band 12b, all greycodes are extracted (step 1006). In a presently preferred embodiment, the operational data to be recovered is repeated in three greycode fields 26 within the same track 11. As a result, those three greycode fields 26 will not match the current guard band track number. Thus, to locate the special greycodes, each greycode is checked against the current track number (step 1008). If the greycode does not match the current track number, then the greycode is saved as a special greycode (i.e., it is possibly operational data) (step 1010), and the count is incremented (step 1012). If this is the last expected special greycode, e.g., the third one, then the check is finished (step 1014–1016) and the operational data has been recovered. Otherwise, this is not the last special greycode, and the checking of greycodes continues (step 1014–1018). After the three special greycodes are found, they are compared against one another as an error check. That is, the greycodes found that do not match the current track number should match each other. If there is a mismatch between the special greycodes, then an error has occurred, and the operational data cannot be recovered from this track 11 (steps 1020–1022).

If the greycode has not been recovered from the preceding track 11 and the track number is still within the range of the guard band 12*b*, an attempt is made to retrieve operational data from the next available guard band track 11 (steps 1024–1026), and the steps above are repeated. If the next track 11 is beyond the range of the guard band 12*b*, a failure condition occurs (steps 1024–1028). In such a failure case, the operational data cannot be recovered.

This process describes how a single piece of operational data is inserted at the servowriter 50 and recovered at the verifier 60. Obviously, this process could be slightly modified to insert and recover multiple pieces of operational data.

In a particular application of the present invention, the operational data is used to track and control the quality of the servowriter 50. In such a case, the verifier 60 must know the identify of the servowriter 50 that formatted each disk 10. In a typical disk format production arrangement, multiple servowriters 50 simultaneously format batches of disks 10. Those disks are then transported to multiple verifiers 60. In such a production environment, it is vital to track the quality of the servowriters 50 and to identify those servowriters 50 that are performing inadequately. As such, each disk 10 is tagged during the servowriting process with an identification of the servowriter that formatted that disk. As previously indicated, this servowriter identifier (i.e., the operational data) will be recorded in place of the greycode field 26 within several servo sectors 16. Thereafter, the servowriter identifier mark can be recovered at the verifier 60 during the verification process.

When the servowriter 50 has been identified it is written to the disk 10 as data on the Z-tracks. Moreover, the servowriter identifier can be save in a database file so that servowriter confidence and yields can be tracked. Faulty servowriters are then determined based on a confidence value. In particular, if a particular servowriter confidence value falls below a threshold, the servowriter 50 is shut down. The servowriter confidence value is determined by the number of consecutive passes and fails for a particular servowriter.

In the presently preferred embodiment, the confidence value is reduced by 10% for each fail and increased by 5% for each pass. Thus, a few failures rapidly reduced the confidence value. By setting this value accordingly, a servowriter's 50 quality can be controlled.

A second application of the present invention transfers media type between the servowriter and the verifier. The blank magnetic disks may be produced by a variety of manufacturers. As a result, disk characteristics may vary. In order for the verifier, and eventually the user's drive, to optimize performance, the media type is determined and the verifier, and the user's drive, is adjusted. The media type is determined during the servowriter stage, when the media first arrives from the media vendors. Accordingly, when the servowriter formats a disk, media type is inserted onto the disk as the operational data (i.e., via the greycode). Thereafter, when the disk is verified, the media type is extracted, used by the verifier and then copied to the Z-track for use by a user's drive.

Those skilled in the art will readily appreciate that many modifications to the invention are possible within the scope of the invention. For example, the operational data could merely contain a unique disk identifier. By then connecting the servowriters and verifiers together over a network, data for each disk can be stored in a database and retrieved by the servowriters 50 and verifiers 60. Moreover, the techniques described herein are not limited to tracing servowriters during the disk format process. Other uses for the methods disclosed are possible. For example, the disks could be traced during their useful life and high in-use failure rates identified. Accordingly, the scope of the invention is not intended to be limited by the preferred embodiment described above but only by the appended claims.

What is claimed is:

1. In a format process for blank magnetic disks, wherein the disks are moved from at least a first station to a second station during the format process, a method of transferring operational data for each disk from the first station to the second station, comprising the steps of:

a) at the first station, performing a format operation on the disk and inserting an electromagnetic signal indicative of the first station into a servo sector on the disk, wherein the electromagnetic signal is inserted in a guard band track;

b) transferring the disk to the second station;

c) at the second station, extracting the electromagnetic signal indicative of the first station from the servo sector.

2. The method as recited in claim 1, wherein the electromagnetic signal is inserted into a grey code field.

3. The method as recited in claim 1, comprising the further step of moving the electromagnetic signal to a second location on the magnetic surface of the disk.

4. The method as recited in claim 3, wherein the second location is located in a Z-track.

5. The method as recited in claim 1, wherein the operational data comprises a value indicative of the first station.

6. In a format process for blank magnetic disks, wherein the disks are moved from at least a first station to a second station during the format process, a method of transferring operational data for each disk from the first station to the second station, wherein the operational data comprises a value indicative of media type, comprising the steps of:

a) at the first station, performing a format operation on the disk and inserting an electromagnetic signal indicative of the first station into a servo sector on the disk;

b) transferring the disk to the second station;

c) at the second station, extracting the electromagnetic signal indicative of the first station from the servo sector.

7. In a process for formatting a plurality of magnetic disks, wherein each disk is formatted by one of a plurality of servowriters and verified by one of a plurality of verifiers, a method of inserting disk specific operational data indicative of the media type into the Z-track, comprising the steps of:

at each servowriter:
   a) loading the disk onto the servowriter;
   b) formatting the disk;
   c) writing at a first frequency operational data onto the disk surface wherein the operational data indicative of the media type is inserted into at least one of the servo sectors on the disk;
   d) removing the disk from the servowriter;

at each verifier:
   e) inserting the disk into the verifier;
   f) reading the operational data from the disk surface; and
   g) writing at a second frequency the operational data to a Z-track.

8. The method as recited in claim 7, wherein the servo sector is located in a guard band track.

9. The method as recited in claim 7, wherein the step of inserting the operational data indicative of media type into at least one of the servo sectors on the disk comprises the step of inserting the operational data into a greycode field of the servo sector.

10. In a format process for blank magnetic disks, wherein the disks are moved from at least a first station to a second station during the format process, a method of tagging the magnetic disks in order to track the quality of the format process, comprising the steps of:
   a) performing a first step in the format process on the magnetic disks at the first station;
   b) while each magnetic disk is at the first station, embedding an electromagnetic signal indicative of the first station into the magnetic surface of the disk;
   c) performing a second step in the format process on the magnetic disks at the second station;
   d) while each magnetic disk is at the second station, reading the electromagnetic signal indicative of the first station; and,
   e) if errors are detected during the second step in the format process, determining the first station based on the electromagnetic signal indicative of the first station.

11. The method as recited in claim 10, wherein the electromagnetic signal indicative of the first station is embedded in a guard band track.

12. The method as recited in claim 11, wherein the electromagnetic signal is inserted into a grey code field.

13. The method as recited in claim 10, comprising the further step of moving the electromagnetic signal indicative of the first station to a second location on the magnetic surface of the disk.

14. The method as recited in claim 13, wherein the second location is located in a Z-track.

15. In a process for formatting a plurality of magnetic disks, wherein each disk is formatted by one of a plurality of servowriters, and wherein each disk is verified by one of a plurality of verifiers, a method of determining the one of the plurality of servowriters that formatted each disk, comprising the steps of:
   at each servowriter:
      a) loading the disk onto the servowriter;
      b) formatting the disk;
      c) inserting a code indicative of the servowriter onto the disk surface;
      d) removing the disk from the servowriter;
   at the verifier:
      e) inserting the disk into the verifier;
      f) reading the code indicative of the servowriter from the disk surface;
      g) verifying the disk; and
      h) if the verification fails, determining the code indicative of the servowriter.

16. The method as recited in claim 15, wherein the step (c) comprises inserting the code into at least one of the servo sectors on the disk.

17. The method as recited in claim 16, wherein the servo sectors are located in a guard band track.

18. The method as recited in claim 16, wherein the step of inserting the code into at least one of the servo sectors on the disk comprises inserting the code into a greycode field of said servo sector.

19. In a process wherein disks are processed at a first station and then moved to a second station for further processing, a method for tracing the process quality of the first station, comprising the steps of:
   at the first station:
      a) performing a first process upon each disk;
      b) recording an identifier indicative of the first station on each disk;
   at the second station:
      c) performing a second process upon each disk;
      d) if the second process is successful, increasing a first value for the first station;
      e) if the test is unsuccessful, decreasing the first value for the first station; and,
      f) if the first value for the first station is below a predefined value, indicating a first station failure.

20. The method as recited in claim 19, wherein the disk comprises a magnetic disk.

21. The method as recited in claim 20, wherein the step (c) of recording the first station identifier comprises the further step of embedding an electromagnetic signal indicative of the first station into the magnetic surface of the disk.

22. The method as recited in claim 21, wherein the electromagnetic signal indicative of the first station is embedded in a guard band track.

23. The method as recited in claim 21, wherein the electromagnetic signal is inserted into a grey code field.

24. The method as recited in claim 20, comprising the further step of moving the electromagnetic signal indicative of the first station to a second location on the magnetic surface of the disk.

25. The method as recited in claim 24, wherein the second location is located in a Z-track.

26. The method as recited in claim 19, wherein the first station comprises a servowriter.

27. The method as recited in claim 19, wherein the second station comprises a verifier.

* * * * *